United States Patent
Xu et al.

(10) Patent No.: US 10,694,686 B2
(45) Date of Patent: *Jun. 30, 2020

(54) GENERATING DIGITAL MODELS OF CROP YIELD BASED ON CROP PLANTING DATES AND RELATIVE MATURITY VALUES

(71) Applicant: The Climate Corporation, San Francisco, CA (US)

(72) Inventors: Ying Xu, Boston, MA (US); Erik Andrejko, Oakland, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,589

(22) Filed: Apr. 4, 2019

(65) Prior Publication Data

US 2019/0230873 A1 Aug. 1, 2019

Related U.S. Application Data

(63) Continuation of application No. 14/990,463, filed on Jan. 7, 2016, now Pat. No. 10,251,347.

(51) Int. Cl.
| | |
|---|---|
| *G06Q 50/02* | (2012.01) |
| *A01G 22/00* | (2018.01) |
| *A01G 7/00* | (2006.01) |
| *G06Q 10/04* | (2012.01) |

(Continued)

(52) U.S. Cl.
CPC .............. *A01G 22/00* (2018.02); *A01G 7/00* (2013.01); *G06Q 10/04* (2013.01); *G06Q 50/02* (2013.01); *H04L 43/045* (2013.01); *H04L 67/10* (2013.01); *H04L 67/12* (2013.01)

(58) Field of Classification Search
None
See application file for complete search history.

(56) References Cited

U.S. PATENT DOCUMENTS

| | | |
|---|---|---|
| 2005/0027572 A1 | 2/2005 | Goshert et al. |
| 2013/0018586 A1 | 1/2013 | Peterson et al. |

(Continued)

OTHER PUBLICATIONS

Xu, U.S. Appl. No. 14/990,463, filed Jan. 7, 2016, Office Action, dated Jun. 15, 2018.

(Continued)

*Primary Examiner* — Syed A Roni
(74) *Attorney, Agent, or Firm* — Hickman Palermo Becker Bingham LLP

(57) ABSTRACT

A method for generating digital models of potential crop yield based on planting date, relative maturity, and actual production history is provided. In an embodiment, data representing historical planting dates, relative maturity values, and crop yield is received by an agricultural intelligence computer system. Based on the historical data, the system generates spatial and temporal maps of planting dates, relative maturity, and actual production history. Using the maps, the system creates a model of potential yield that is dependent on planting date and relative maturity. The system may then receive actual production history data for a particular field. Using the received actual production history data, a particular planting date, and a particular relative maturity value, the agricultural intelligence computer system computes a potential yield for a particular field.

20 Claims, 9 Drawing Sheets

(51) Int. Cl.
    *H04L 12/26*     (2006.01)
    *H04L 29/08*     (2006.01)

(56) References Cited

U.S. PATENT DOCUMENTS

2013/0332205 A1    12/2013    Friedberg et al.
2014/0358486 A1    12/2014    Osborne

OTHER PUBLICATIONS

Xu, U.S. Appl. No. 14/990,463, filed Jan. 7, 2016, Notice of Allowance, dated Nov. 21, 2018.
The International Bureau of Wipo, "Search Report", in application No. PCT/US2016/065758, dated Jul. 10, 2018, 12 pages.
International Searching Authority, "Search Report", in application No. PCT/US2016/065758, dated Feb. 17, 2017, 17 pages.
Current Claims in application No. PCT/US2016/065758, dated Jul. 2018, 12 pages.
Current Claims in application No. PCT/US2016/06575, dated Feb. 2017, 12 pages.
European Patent Office, "Search Report" in application No. 16 884 160.9-1222. dated Jan. 10, 2020, 8 pages.
European Claims in application No. 16 884 160.9-1222, dated Jan. 2020, 7 pages.

Fig. 2
(a)
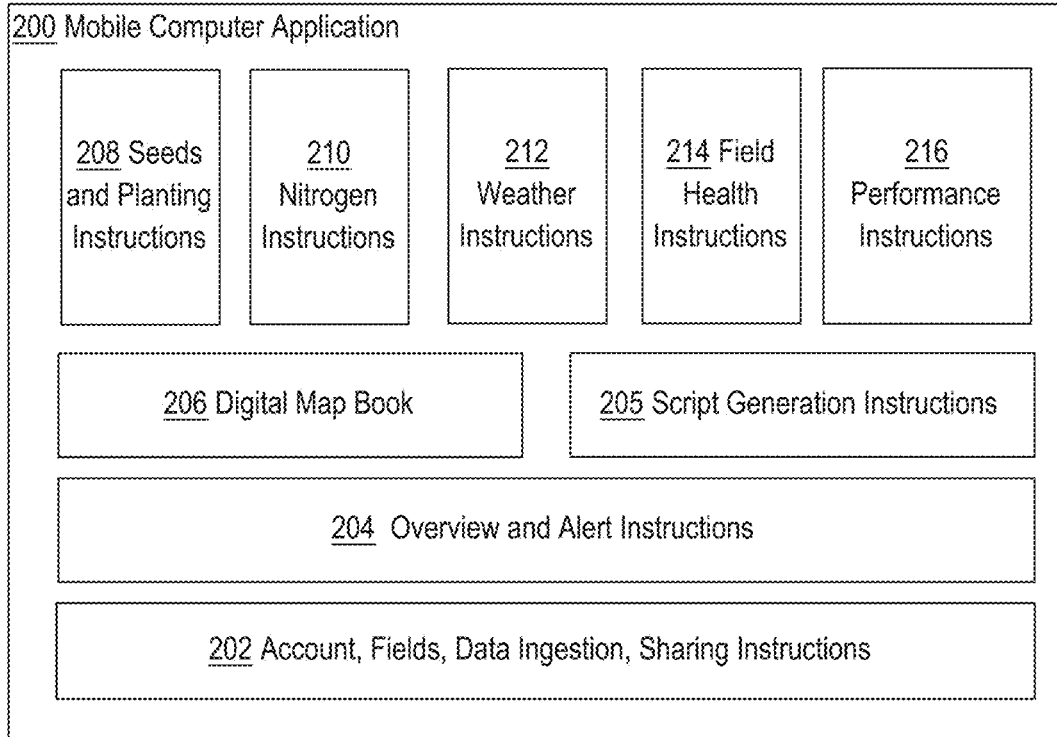
(b)
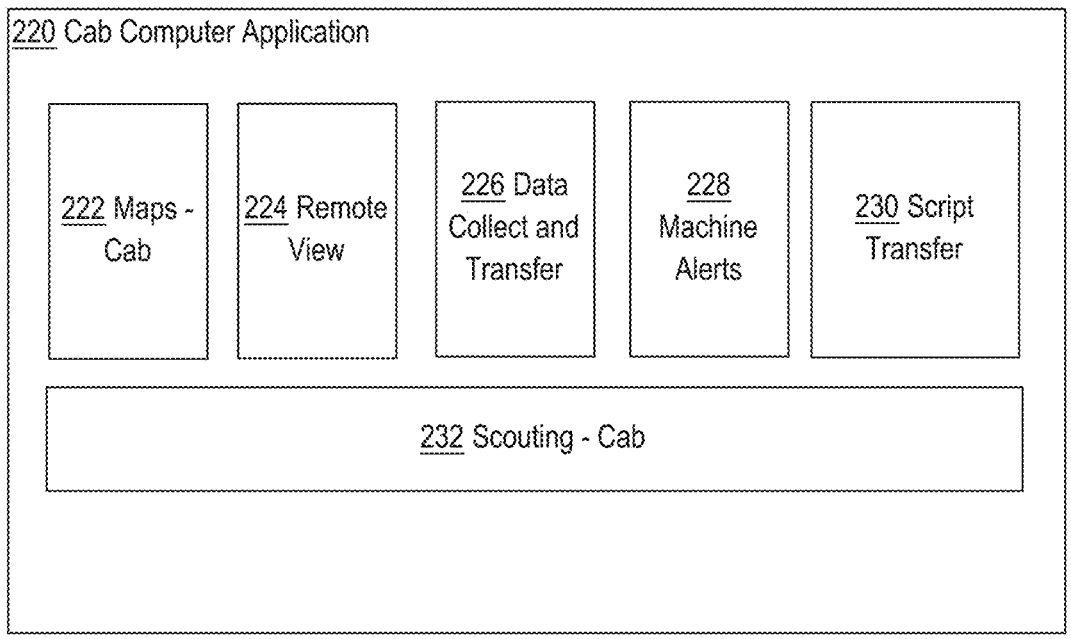

Data Manager

| Nitrogen | Planting | Practices | Soil |

Planting 1 (4 Fields)
Crop Corn Product
Plant Date: 2016-04-12
ILU 112 | Pop: 34000
[Edit] [Apply]

Planting 2 (0 Fields)
Crop Corn Product
Plant Date: 2016-04-15
ILU 83 | Pop: 34000
[Edit] [Apply]

Planting 3 (0 Fields)
Crop Corn Product
Plant Date: 2016-04-13
ILU 83 | Pop: 34000
[Edit] [Apply]

Planting 4 (1 Fields)
Crop Corn Product
Plant Date: 2016-04-13
ILU 112 | Pop: 34000
[Edit] [Apply]

＋
Add New
Planting Plan

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

GDD cut off values for corn

| Stage | V2 | V4 | V6 | V8 | V10 | V12 | V14 | V16 | R1 | R2 | R3 | R4 | R5 | R5.5 | R6 |
|---|---|---|---|---|---|---|---|---|---|---|---|---|---|---|---|
| GDD | 177 | 306 | 421 | 540 | 655 | 771 | 886 | 1005 | 1240 | 1526 | 1818 | 2120 | 2281 | 2499 | 2700 |

…

GENERATING DIGITAL MODELS OF CROP YIELD BASED ON CROP PLANTING DATES AND RELATIVE MATURITY VALUES

BENEFIT CLAIM

This application claims the benefit under 35 U.S.C. § 120 as a Continuation of application Ser. No. 14/990,463, filed Jan. 7, 2016, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to digital computer modeling of potential crop yield based on planting dates and relative maturity values. Additionally, the present disclosure relates to generation of notifications, recommendations, and graphical user interfaces based on digital models of potential yield.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Farmers often must make planting decisions regarding one or more fields based on incomplete information. Specifically, before planting a crop, a farmer must determine when to plant the crop to achieve maximum crop yield. While the general planting season for a particular type of crop may be generally known, due to various temperature and weather related factors, the actual yield of a crop may vary based on the day within the planting season when the crop is planted.

An additional decision a farmer must make involves the type of seed hybrid planted. Crops, such as corn, generally have multiple types of hybrid, each of which may produce a different yield of corn. While the type of hybrid effects the total yield of the crop, the effect of selecting one seed over another changes with respect to planting date and location. For example, for a particular planting day in a first location, a first seed type may produce a higher yield than a second seed type, while for the same planting day in a second location, the second seed type may produce a higher yield than the first seed type.

Given the dependence of total crop yield the type of seed planted, the date the seed is planted, and the location of the field, objective data identifying the best planting date and seed type is generally unavailable. As the type of seed planted and the date of planting may have a strong impact on the total yield of the farm, and thus on the total profits of the farmer, it would be beneficial to provide a farmer with data indicating the best planting dates and seed selections for the farmer's particular field.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 9 illustrates an example chart where the number of growing degree days are used to define the start and end of different phenological development stages.

DETAILED DESCRIPTION

Figure 1:
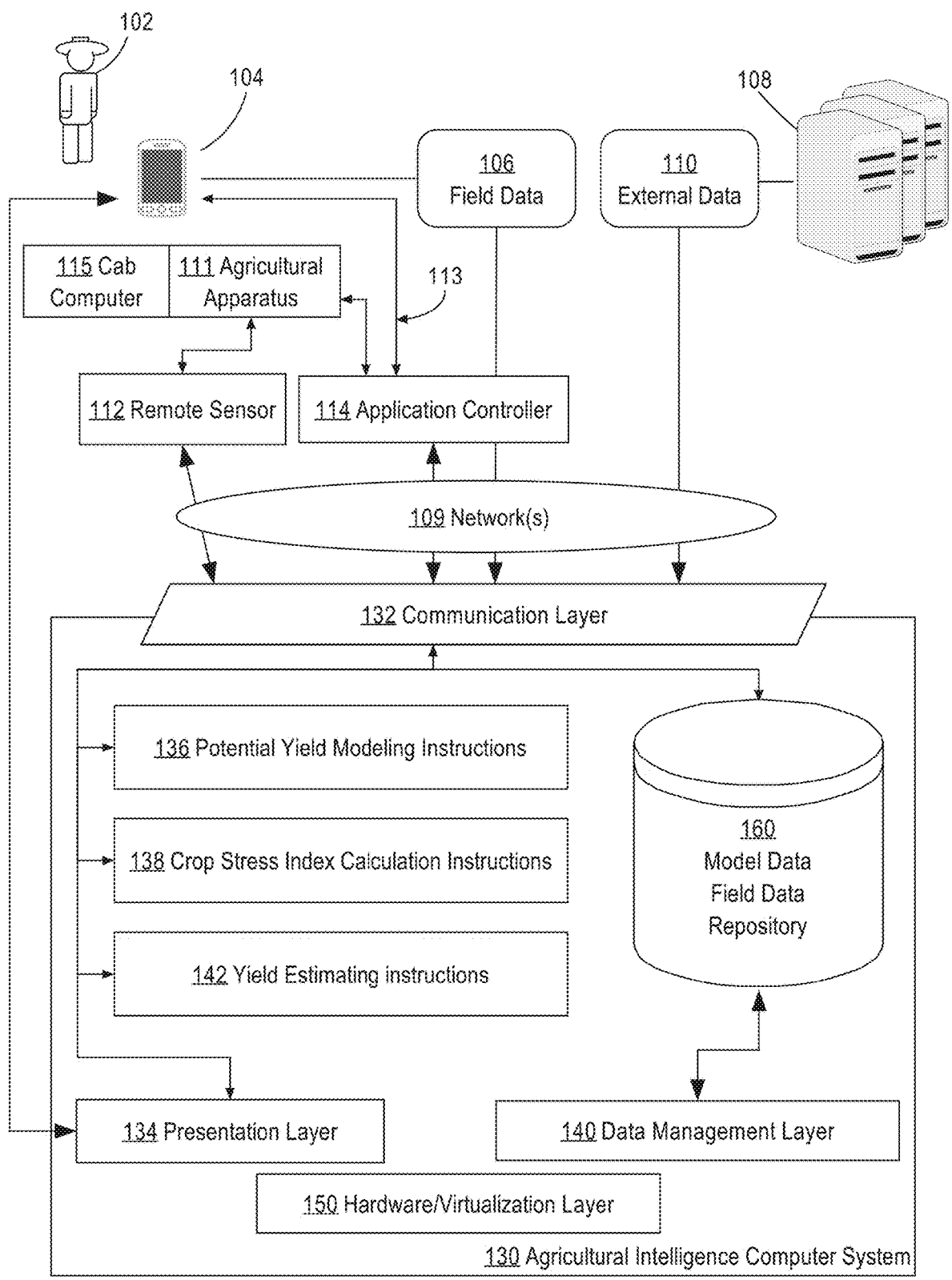
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
  2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5. IMPLEMENTATION EXAMPLE—HARDWARE OVERVIEW
  3. YIELD ESTIMATE MODEL
    3.1. RECEIVED DATA
    3.2. GENERATING HISTORICAL MAPS
    3.3. MODELING POTENTIAL YIELD
    3.4. MODELING PREDICTED YIELD 3.5. CROP STRESS INDICES
  3.5.1. CROP PHENOLOGY
  3.5.2. FLOOD STRESS
  3.5.3. DROUGHT STRESS
  3.5.4. EARLY DROUGHT STRESS
  3.5.5. DAYTIME HEAT STRESS
  3.5.6. NIGHTTIME HEAT STRESS
  3.5.7. NUTRIENT STRESS
3.6. MODEL STRENGTHENING
4. MODEL USAGE
4.1. ESTIMATING TOTAL CROP YIELD
4.2. PLANTING DATE RECOMMENDATIONS
4.3. SEED RECOMMENDATIONS
5. BENEFITS OF CERTAIN EMBODIMENTS
6. EXTENSIONS AND ALTERNATIVES

1. General Overview

Aspects of the disclosure generally relate to computer implemented techniques for generating a model of estimated yield of a crop based on a model of potential yield from the planting date, relative maturity, and actual production history of one or more fields. In an embodiment, an agricultural intelligence computer system receives historical data identifying crop planting dates, seed relative maturity values, and past yield values for a plurality of locations. Based on the received historical data, the system creates one or more maps of planting dates, relative maturity, and actual production history. Using the created maps, the system generates a model of potential yield that is dependent on relative maturity, planting dates, location, and actual production history. The system then receives actual production history values for a particular field. Using the actual production history values for the particular field, a particular planting date, and a particular relative maturity value, the system computes a potential yield for the particular field. The system may then model the actual yield of the crop based on the computed potential yield.

In an embodiment, a method comprises receiving, over a network at a server computer system comprising one or more processors and digital memory, first electronic digital data comprising a plurality of values representing historical relative maturity for crops planted on a plurality of fields over a plurality of years; using digitally programmed potential yield modeling instructions of the server computer system, generating one or more relative maturity maps from the plurality of values representing historical relative maturity; receiving, over the network at the server computer system, second electronic digital data comprising a plurality of values representing historical planting date for crops planted on a plurality of fields over a plurality of years; using digitally programmed potential yield modeling instructions of the server computer system, generating one or more planting date maps from the plurality of values representing historical planting date; receiving, over the network at the server computer system, third electronic digital data comprising a plurality of values representing actual production history for crops planted on a plurality of fields over a plurality of years; using digitally programmed potential yield modeling instructions of the server computer system, generating one or more actual production history maps from the plurality of values representing actual production history; using digitally programmed potential yield modeling instructions of the server computer system, generating a model of potential yield that is dependent on planting date and relative maturity based, at least in part, on the one or more relative maturity maps, the one or more planting date maps, and the one or more actual production history maps; receiving, over the network at the server computer system, fourth electronic digital data comprising a plurality of values representing actual production history for a particular field; using digitally programmed yield estimating instructions of the server computer system, computing, from the model of potential yield, a particular potential yield for the particular field based, at least in part, on the plurality of values representing actual production history for the particular field.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computing device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

An external data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server computer 108 owned by the same entity that owns and/or operates the agricultural intelligence computer system 130. For example, the agricultural intelligence computer system 130 may include a data server focused exclusively on a type of that might otherwise be obtained from third party sources, such as weather data. In some embodiments, an external data server computer 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the field manager computing device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
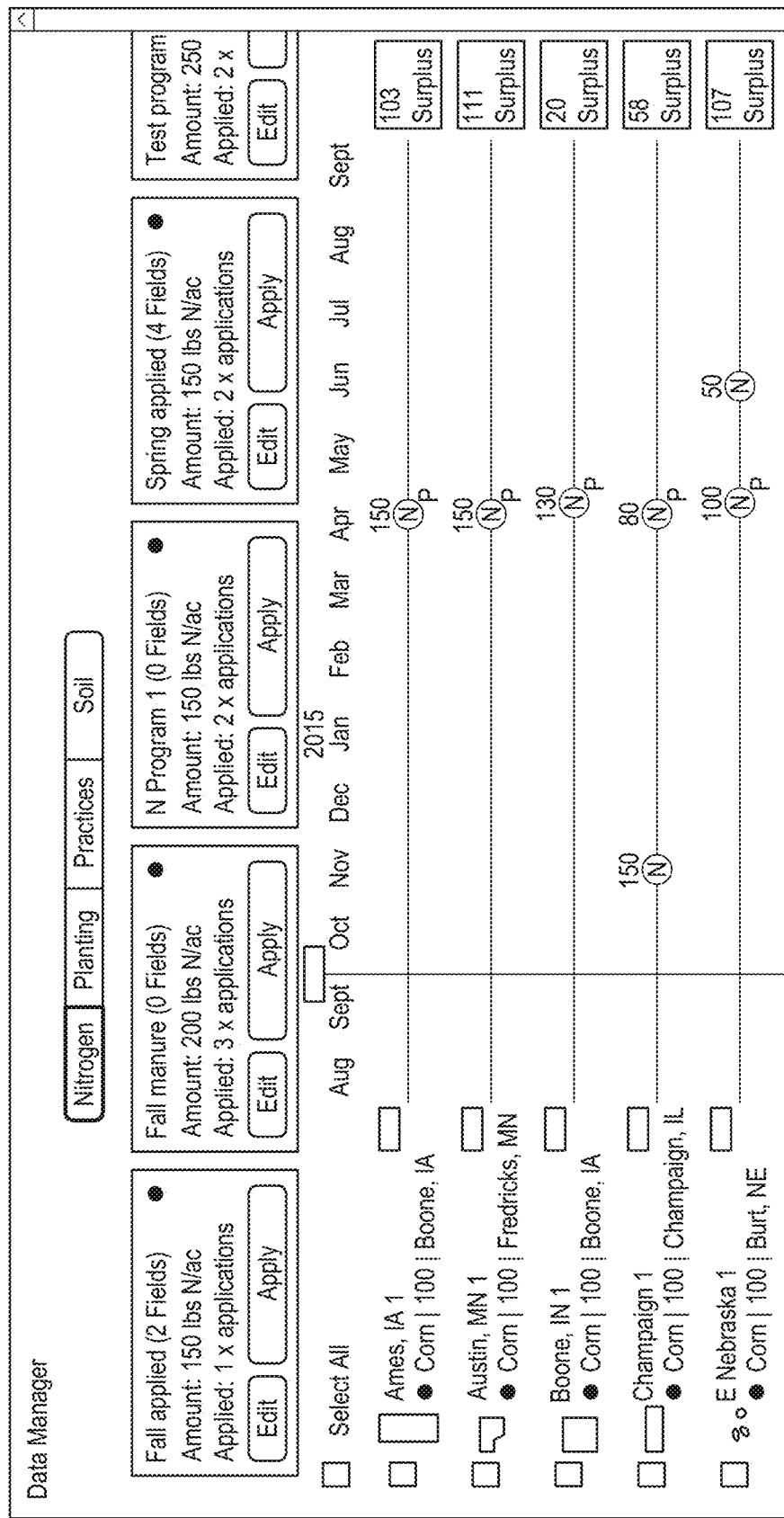
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In one embodiment, each of the potential yield modeling instructions 136, crop stress index calculation instructions 138, and yield estimating instructions 142 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the crop stress index calculation instructions 138 may comprise executable instructions loaded into a set of pages in RAM that contain instructions which when executed cause performing the crop stress index calculation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the potential yield modeling instructions 136, crop stress index calculation instructions 138, and yield estimating instructions 142 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130. The executable instructions in memory, or the stored source code, specified in this paragraph are examples of "modules" as that term is used in this disclosure.

Potential yield modeling instructions 136 generally represent digitally programmed instructions which, when executed by one or more processors of agricultural intelligence computer system 130 cause agricultural intelligence computer system 130 to perform translation and storage of data values and construction of digital models of crop yield. Crop stress index calculation instructions 138 when executed by one or more processors of agricultural intelligence computer system 130 cause agricultural intelligence computer system 130 to perform translation and storage of data values and construction of digital models of weather effects on crop yield. Yield estimating instructions 142 when executed by one or more processors of agricultural intelligence computer system 130 cause agricultural intelligence computer system to perform translation and storage of data values, retrieval of digital models of crop yield and weather effects on crop yield, and generation of yield estimates based on digital models and received field data.

Figure 4:
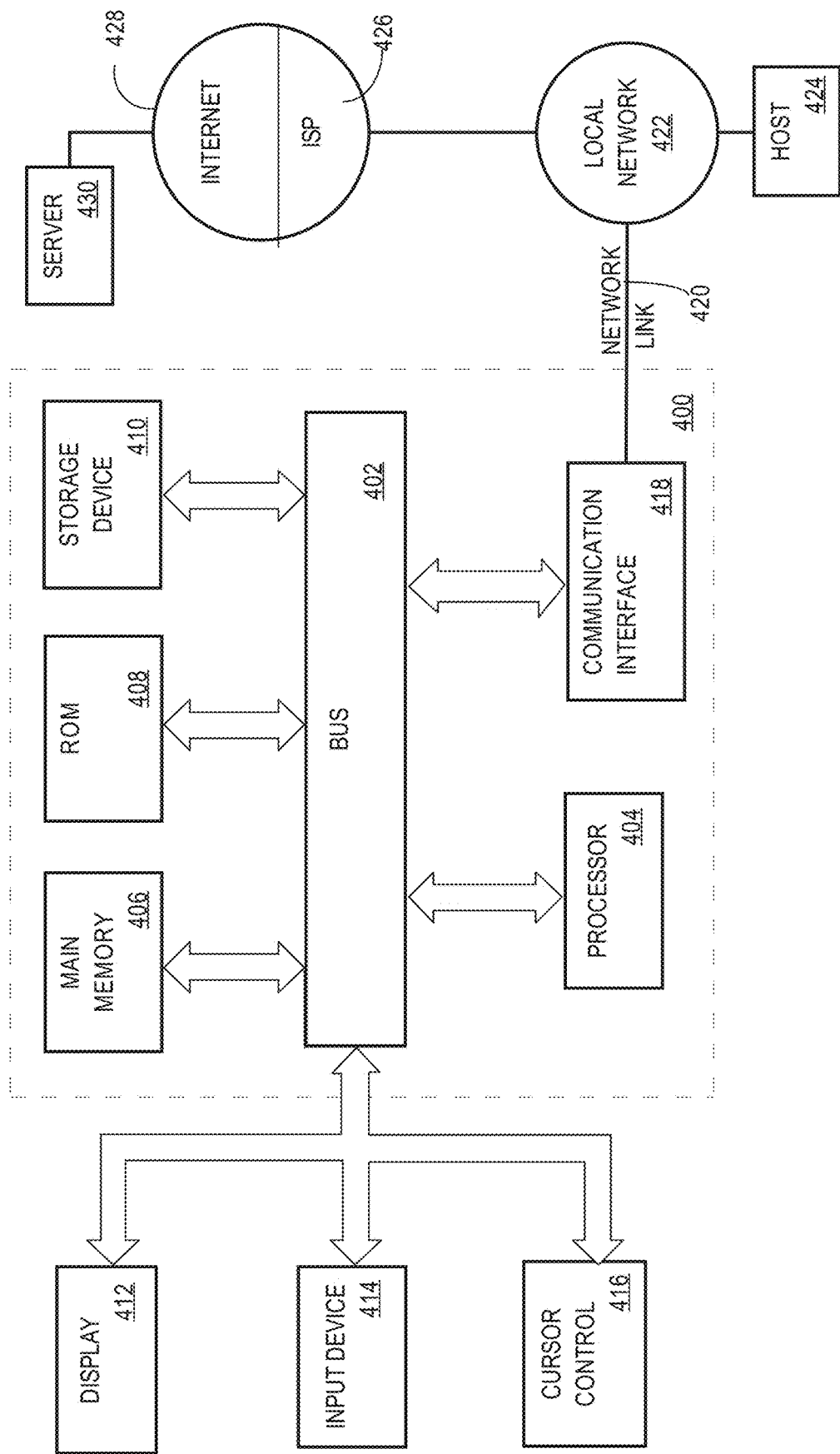
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different field manager computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into soil zones along with a panel identifying each soil zone and a soil name, texture, and drainage for each zone. Mobile computer application 200 may also display tools for editing or creating such, such as graphical tools for drawing soil zones over a map of one or more fields. Planting procedures may be applied to all soil zones or different planting procedures may be applied to different subsets of soil zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
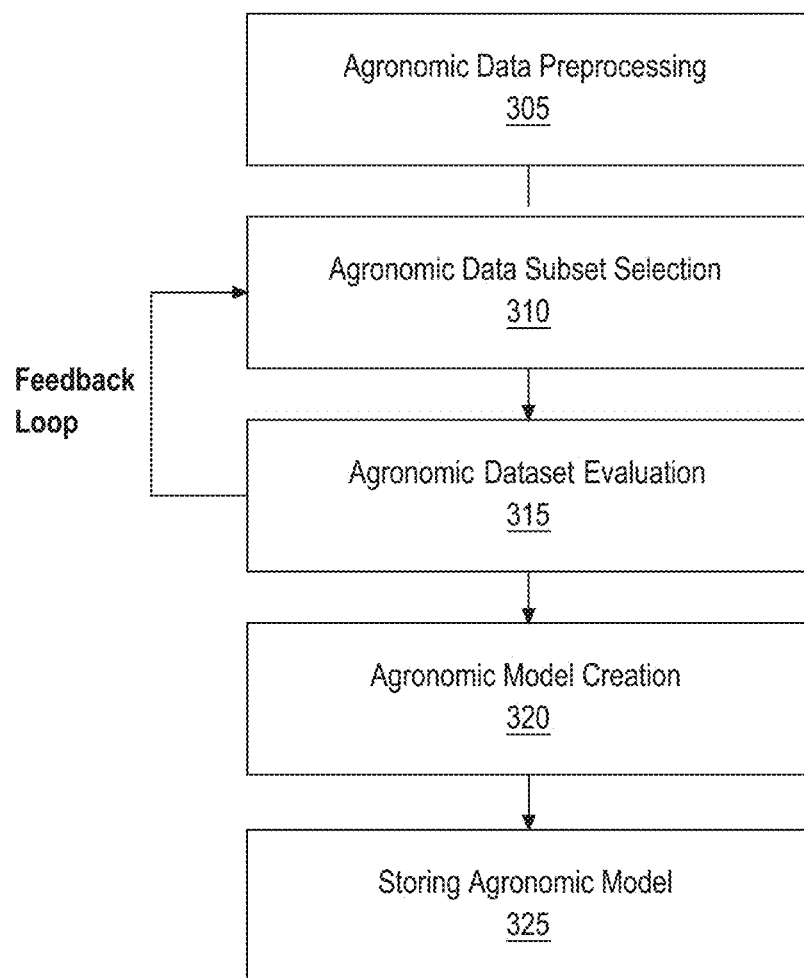
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Yield Estimate Model

3.1 Received Data

Figure 7:
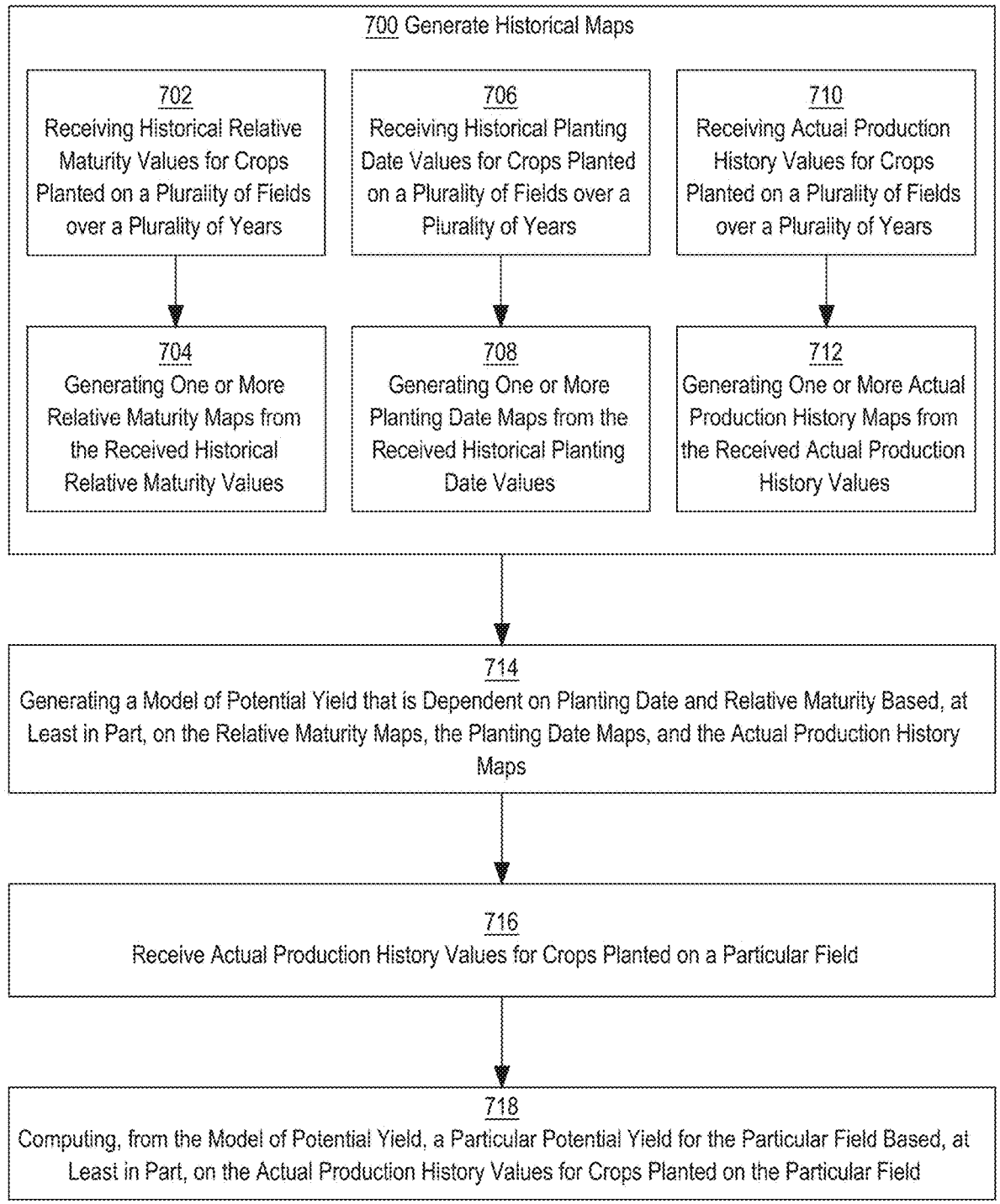
FIG. 7 depicts an example method of creating and utilizing a digital model of potential crop yield based on planting date and relative maturity.

FIG. 7 depicts an example method of creating and utilizing a digital model of potential crop yield based on planting date and relative maturity.

At step 700, historical maps are generated from received data. Historical maps refer to digitally stored data representing historical crop related values with corresponding location values. For example, a historical map may include crop related values for each value or range of values of latitude and longitude. Additionally and/or alternatively, a historical map may include a model that describes changes in values between various locations.

At steps 702, 706, and 710, historical data for crops planted on a plurality of fields over a plurality of years is received. In an embodiment, the historical data is received for a plurality of fields from an external data source. For example, agricultural intelligence computer system 130 may be programmed to request external data from an entity that maintains statistics on planting practices, such as the National Agricultural Statistics Society (NASS), using API calls or other messaging mechanisms. Additionally and/or alternatively, agricultural intelligence computer system 130 may request data from a plurality of sources. For example, agricultural intelligence computer system may receive historical planting dates, actual production history, and/or relative maturity values from farmers using systems provided by agricultural intelligence computer system 130. As another example, agricultural intelligence computer system 130 may receive test data, such as data collected by Farmer's Independent Research of Seed Technologies (F.I.R.S.T.) for particular locations.

Planting date, as used herein, refers to a specific day of the year on which a crop is planted. Relative maturity, as used herein, refers to a property that characterizes the growing season of a particular type of seed. For example, various types of corn hybrids are associated with various different relative maturity values. The relative maturity values of corn hybrids are generally determined by comparing the grain moisture of hybrids at the time of harvest. Actual production history, as used herein, refers to historical yield of a crop at a particular location.

In an embodiment, historical data may be inferred for locations where data is unavailable. For example, actual production history may be available for a particular location where the planting date is unknown. If the particular location was subject to insurance policies which required planting during a particular time period, agricultural intelligence computer system 130 may infer the planting date within the particular time period. Additionally, data values for planting date, relative maturity, or actual production history may be determined by agricultural intelligence computer system 130 based on corresponding data. For example, relative maturity values may be received as hybrid seed data. Agricultural intelligence computer system 130 may be programmed to store data identifying, for each type of hybrid seed, a relative maturity value. If agricultural intelligence computer system 130 receives data identifying a particular type of hybrid seed, agricultural intelligence computer system 130 may look up the relative maturity value associated with the particular type of hybrid seed.

Data may be received at various levels of granularity. For example, agricultural intelligence computer system 130 may receive county averages for planting dates, relative maturity values, and actual production history. Alternatively, agricultural intelligence computer system 130 may receive field specific data for planting dates, relative maturity, and actual production history for a plurality of fields. For example, agricultural intelligence computer system 130 may receive test data from one or more sources that include planting date, relative maturity, and actual production history for a plurality of fields across a geographic region. As another example, agricultural intelligence computer system 130 may receive survey data from farmers indicating, for each field, a location of the field, historical planting dates, historical relative maturity values, and actual production history. Additionally and/or alternatively, the level of granularity may differ for each type of data. For example, agricultural intelligence computer system 130 may receive planting dates from a first source for each field within a geographic region and actual production history from a second source as an average for each county.

3.2 Generating Historical Maps

At steps 704, 708, and 712 historical maps are generated from received data values. At step 704, relative maturity maps are generated from the received historical relative maturity values. At step 708, planting date maps are generated from the received historical planting date values. At step 712, actual production history maps are generated from received actual production history values. As with step 700, each of the maps comprise digitally stored data representing crop related values with corresponding location values.

While FIG. 7 depicts an embodiment of the method where the maps are generated as separate steps, in an embodiment, the steps of generating planting date maps, relative maturity maps, and actual production history maps may be performed together. For example, based on received relative maturity and planting date values for a particular year, agricultural intelligence computer system 130 may be programmed to create a single map that includes relative maturity values and planting dates for each geographic region.

In an embodiment, generating historical maps includes generating data values for locations where data is unavailable. For example, if planting dates are available for two thousand particular locations, agricultural intelligence computer system 130 may be programmed to use the data values at the two thousand particular locations to interpolate data values for the areas in between the two thousand locations. Agricultural intelligence computer system 130 may interpolate data values for planting dates, relative maturity, and actual production history using any of nearest neighbor interpolation, Delaunay triangulation, inverse distance weighting, thin-plate splines, kriging, and/or similar interpolation techniques.

In an embodiment, generating historical maps includes creating average values for particular locations. For example, agricultural intelligence computer system 130 may be programmed to receive planting dates for particular fields for a plurality of years. Agricultural intelligence computer system 130 may also receive data identifying average production values for a plurality of counties. As the average production values cannot be correlated to planting dates at a finer granularity than the county level, agricultural intelligence computer system 130 may create average values of planting dates for the county to correlate to the actual production values. Thus, agricultural intelligence computer system may compute an average planting date for the county by averaging the planting dates for each field within the county or a random sample of fields within the county. In an embodiment, fields within a county are weighted based on an estimated impact on the average planting date for the county. For example, if a first field is twice as large as a second field, agricultural intelligence computer system 130 may give the first field twice the weight as the second field when averaging planting dates. Thus, if the first field was planted on the first of the month and the second field was planted on the thirtieth of the month, agricultural intelligence computer system 130 may compute the weighted average of the planting date of the two fields as the tenth of the month. Additionally and/or alternatively, agricultural intelligence computer system 130 may compute median planting dates for each county and year.

In an embodiment, generating historical maps comprises translation of received data values. For example, received planting dates may initially be described as particular days of particular months. In order to create a model with a planting date dependence, agricultural intelligence computer system 130 may compute relative planting dates for each received planting date. The relative planting date may comprise the difference between the raw median planting date and a reference planting date. The reference planting date may be an aggregated median planting date for the year across a plurality of locations, an aggregated median planting date for a particular location across a plurality of years, and/or an aggregated median planting date across a plurality of locations and a plurality of years. Additionally, agricultural intelligence computer system 130 may translate identified seed types into relative maturity values using stored hybrid seed data.

In an embodiment, agricultural intelligence computer system 130 creates one or more maps separately for each year of a plurality of years. For example, agricultural intelligence computer system 130 may create a planting date map comprising planting dates across a geographic region, such as the continental United States, for a particular year. Additionally, and/or alternatively, agricultural intelligence computer system 130 may create one or more maps for an aggregate of a plurality of years. For example, a planting date map may include planting dates by location and year. A visual representation of a planting date map may contain multiple layers, each of which represent planting dates for a particular year. Maps for different years and locations may be aligned spatially and temporally.

3.3 Modeling Potential Yield

At step 714, a model of potential yield is generated that is dependent on planting date and relative maturity based, at least in part, on the relative maturity maps, the planting date maps, and the actual production history maps. For example, using the maps generated in steps 704, 708, and 712, agricultural intelligence computer system 130 may be programmed to construct a digital model of the potential yield of a crop as a function with random errors. As the data in the generated maps are associated with specific locations and years, the digital model may contain a location dependence and a temporal dependence. For example, agricultural intelligence computer system 130 may use the following equation:

$$W_{c,t} = f(X_{c,t}) + \eta_{c,t}$$

where $W_{c,t}$ represents the potential yield of a crop at location c and year t with a particular planting date and relative maturity under ideal conditions, $f(X_{c,t})$ is a link function with a location and temporal sensitive covariate matrix $X_{c,t}$ which includes terms related to planting dates and relative maturity, and $\eta_{c,t}$ is a location and temporal sensitive random error term.

In an embodiment the link function, $f(X_{c,t})$, is a linear function, $\beta X_{c,t}$, that includes, for a given location and year, constant parameterized using the generated maps, $\beta$, and a covariate matrix, $X_{c,t}$, of predictor variables. The predictor variables in $X_{c,t}$ may include a planting date variable and a relative maturity variable. In some embodiments, $X_{c,t}$ includes an actual production history variable for a particular location with a temporal dependence. For example, if the production history of the particular location has been decreasing over the past ten years, the actual production history variable may include a term describing the decrease in production over time. In additional embodiments, $X_{c,t}$ includes a squared value of relative maturity and a squared value of relative planting date in order to account for more complex relationships between the planting date, relative maturity, and potential yield. In an embodiment, the link function also includes a matrix, β, of coefficients associated with the predictor variables. While the covariate matrix, $X_{c,t}$, may depend on location and year, in and embodiment, β contains coefficients that are independent of location and time. may be identified using any parameterizing analysis, such as least squared regression or generalized linear regression, in order to describe a general relationship between planting date, relative maturity, and total yield.

3.4 Modeling Yield

The model of potential yield described above models a relationship between planting date, relative maturity, and a total potential yield for a crop given ideal conditions. While relative maturity and planting dates may be observed, the potential yield of a crop is unobservable. Thus, to build the model of potential yield, agricultural intelligence computer system 130 may be programmed to treat the potential yield as a latent function in a model of actual yield. The model of actual yield may incorporate the potential yield and one or more values representing stress factors that limit the total yield of a crop. For example, a liner model of the crop yield may be depicted as follows:

$$Y_{c,t} = W_{c,t} + \gamma_c Z_{c,t} + \varepsilon_{c,t}$$

where $Y_{c,t}$ is the total yield at a particular location and time, $W_{c,t}$ is the potential yield for the particular location and time, $Z_{c,t}$ is a covariate matrix including crop stress indices, $\gamma_c$ is a location specific set of coefficients corresponding to the crop stress indices, and $\varepsilon_{c,t}$ is a random error term. The crop stress indices, as described further herein, represent conditions that negatively affect the optimal yield of a crop. As the effects of each crop stress index may vary from location to location, the set of coefficients corresponding to the crop stress indices, $\gamma_c$, may be parameterized separately for each location or with one or more location dependent terms. For example, if the crop stress index representing day heat stress has a large impact on the crop yields at a first location than at a second location, the corresponding coefficient for the first location may be higher than the corresponding coefficient for the second location. As the differences between the effects of crop stress indices do not vary heavily between some locations, in an embodiment $\gamma_c$ is assumed to be normally distributed for each coefficient value with a mean of $\gamma_0$ and variance of $\sigma_0^2$.

In an embodiment, agricultural intelligence computer system 130 is programmed to generate the model of potential crop yield using the model of total yield. Agricultural intelligence computer system 130 may model the potential crop yield as a latent function of the observed total yield using past crop stress data and past yield values for a particular location. For example, agricultural intelligence computer system 130 may receive data identifying, for a particular location and year, temperature measurements, precipitation measurements, watering practices, nutrient applications, and soil data. Based on the received data, agricultural intelligence computer system 130 may model the effects of various crop stress indices on the total yield of a crop. Based on the modeled effects of crop stress and the total yield, agricultural intelligence computer system 130 may determine potential crop yields for each location and year. The identified potential crop yields for each location may then be used to identify effects on crop yield of planting date and relative maturity.

In an embodiment, modeling the actual yield further comprises generating the model as a function of distributions of modeling parameters. For example, each modeling parameter may be fitted under a Bayesian framework such that a distribution is generated for each modeling parameter instead of point estimates. By basing the model of actual yield on probabilistic estimates of modeling parameters, such as relative maturity and planting dates, a model is created which better estimates uncertainty in actual yield and allows for smarter decision making with respect to risk tolerance.

3.5 Crop Stress Indices

As described, crop stress indices are used to quantify extreme events that may cause stress to crop growth and may negatively affect optimal crop yield. Types of crop stress indices include, but are not limited to, flood stress, drought stress, day heat stress, night heat stress, early drought stress, and nutrient stress. Each type of crop stress index described is a digitally stored value that is calculated by computer using observed agricultural data over a specified period. In an embodiment, the specified period used to calculate a crop stress index may be derived from a crop's lifecycle called the crop phenology.

3.5.1 Crop Phenology

Figure 8:
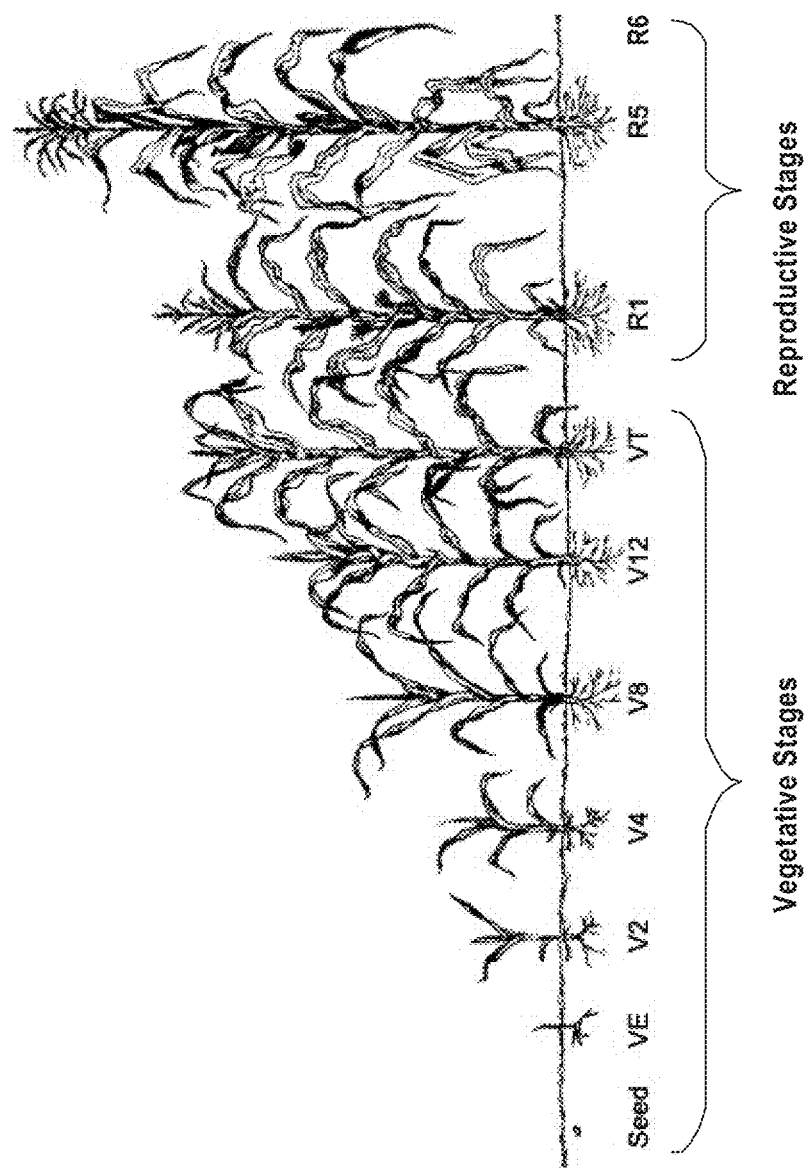
FIG. 8 illustrates an example embodiment of corn growth stages.

The lifecycle of corn plants is measured using growth development stages starting from seeding to physiological maturity, also known as black layer. FIG. 8 illustrates an example embodiment of corn growth stages. Corn growth stages are divided into two major types of stages, vegetative and reproductive stages. Vegetative growth stages are the stages where the corn plant develops from a seed to a fully formed plant. The vegetative growth stages are characterized by the crop increasing in biomass, developing roots, stalk, and leaves, and preparing itself for reproduction. Vegetative growth stages begin with the corn emergence stage, labelled as "VE", and end with the fully visible tassel stage, "VT". Corn emergence (VE) signifies the first visible site of the corn plant from the ground. Fully visible tassel (VT) signifies the stage where the tassels, pollen producing flowers, are completely visible. Between the VE and VT stages exist multiple vegetative stages that describe the growth of the corn plant by how many uppermost leaves are visible with the leaf collar. For example, "V2" signifies the growth stage where two leaves are fully expanded with the leaf collar visible, and "V12" signifies the growth stage where twelve leaves are fully expanded with the leaf collar visible.

The reproductive stages describe stages from when pollen may occur to the corn plant's physical maturity. The reproductive stages begin at silking stage "R1" and end at the physiological maturity stage "R6", also known as the black layer stage. Between stages R1 and R6 are stages describing the corn plant's growth. For example, "R2" is called the blister stage where kernels are described as being white and resemble a blister in shape. Stage "R3" is called the milk stage, where kernels are yellow on the outside with milky inner fluid. Stage "R4" is called the dough stage, where the milky inner fluid thickens to a pasty consistency. Stage "R5" is called the dent stage, where the kernels show a physical dent.

The phenology stages of the corn plant may be tracked based upon factors outside the appearance of the individual corn plants. For example, the phenological development of corn plants is strongly related to the accumulation of heat by the corn plants, which furthers corn plant growth. The accumulation of heat may be measured by daily maximum and minimum temperatures. In an embodiment, growing degree days (GDD) are used to track the different developmental stages of corn plant growth. GDD may be calculated using different observational data and different thresholds. For example, GDD may be calculated as:

$$\text{Daily } GDD = \frac{T_{max} + T_{min}}{2} - T_{base} \text{ where } \frac{T_{max} + T_{min}}{2}$$

is the daily average temperature calculated from the daily maximum and minimum temperatures. $T_{base}$ is a lower threshold temperature where no significant corn plant growth occurs. In an embodiment, cutoff values may be set for $T_{max}$ and $T_{min}$. For example, a cutoff value of 86° F. may be set for $T_{max}$ such that $T_{max}$ is set to 86° F. when temperatures exceed 86° F. and a cutoff value of 50° F. may be set for $T_{min}$ such that $T_{min}$ is set to 50° F. when temperatures fall below 50° F.

Therefore when the daily average temperature does not exceed the lower threshold temperature, no growth in the corn plant occurs. FIG. 9 illustrates an example chart where the number of growing degree days are used to define the start and end of different phenological development stages. For example, after 177 GDDs the V2 stage of the corn plant starts. At GDD 1240, the first reproductive stage, R1, begins. While FIG. 9 generally illustrates different phenological development stages for a particular crop, in an embodiment different hybrid seed types may enter phenological stages at different times. For example, the cutoff for the V2 stage of a corn plant with a higher relative maturity value than the one depicted in FIG. 9 may occur after 177 GDDs. Measuring GDDs is particularly useful when determining specific weather indices that correlate to different development stages in corn plant growth.

3.5.2 Flood Stress

Flooding of fields can be extremely detrimental to the growth of corn crop. For example, standing water may become ponded on top of corn plants causing them to suffer from overwatering and a depletion of oxygen content in the soil. Lack of oxygen in soil may inhibit plants from performing functions such as nutrient and water uptake which will negatively affect the overall crop yield. A flood stress index may be used to quantify the negative effects of observed flooding in order to more accurately predict crop yields. In an embodiment, flood stress is calculated as the sum of the daily water runoff that is above a particular threshold of runoff water. Runoff refers to water not absorbed by the soil that flows above the soil. When measuring runoff, some runoff may be a result of water not being absorbed as fast as the scheduled watering session delivers the water. Therefore only runoff that is above an allowable threshold is considered to be contributing to flood. For example, if the allowable threshold of runoff for a field is configured as 3.75 inches, then any measured runoff above 3.75 inches counts toward the total amount of runoff for calculating flood stress. In an embodiment, stage one flood stress may be calculated as the sum of daily runoff that is above 3.75 over a period from seeding to V8, where stage one covers seeding through V8. In other embodiments, the threshold may be adjusted based upon the soil composition and water absorption rate of the soil.

3.5.3 Drought Stress

Inadequate soil moisture during growth periods can result in reduced corn yield because nutrient availability, uptake, and transport are impaired without sufficient water in the soil. A drought stress index may be used to quantify the level of inadequate soil moisture over various stages of crop growth. In an embodiment, drought stress is calculated as the sum of daily soil moisture records that are below a specified drought threshold. For example, if the specific drought threshold is 20% then all daily soil moisture records that fall below 20% are summed together over the measured growth stages to make up the drought stress crop stress index. In an embodiment, stage one drought stress is calculated as the sum of all daily soil moisture records between growth stages V8 and V16 where the soil moisture value is below the 20% drought threshold. In other embodiments, drought stress may be calculated as stage two and stage three drought stress, where stage two covers growth stages from R1 through R2, and stage three covers growth stages from R3 through R5.

3.5.4 Early Drought Stress

As discussed, inadequate soil moisture during growth periods can result in reduced corn yield, particularly in the early growth stages. In an embodiment, early drought stress may be measured as the sum of the amount of precipitation minus runoff when daily precipitation minus runoff is between zero and 2.5 inches. Precipitation minus runoff equals the amount of water that is absorbed into the soil. By only quantifying water absorbed into the soil when it is below 2.5 inches the early drought stress quantifies when only little water is absorbed. In an embodiment, early drought stress covers the range from planting to V6.

3.5.5 Daytime Heat Stress

High daytime temperatures can be extremely detrimental to the growth of corn crop. High daytime temperatures, above a certain temperature, may adversely affect corn growth during vegetative and reproductive stages and may negatively affect corn yield. Additionally, extreme daytime temperatures may cause premature drying of soil, which may cause drought. In an embodiment, daytime heat stress may be calculated as the sum of number of degrees Fahrenheit for each day above a defined threshold.

For example, the agricultural intelligence computer system 130 may calculate the daytime heat stress over a period covering stages V10 through V16, where the defined threshold is 93 degrees Fahrenheit. In this example, each of the daily maximum temperatures between growth stages V10 and V16 are evaluated to determine whether any exceed 93 degrees Fahrenheit. If none of the daily maximum temperatures exceed 93 degrees Fahrenheit, then the daytime heat stress during this period would be zero. If however, the daily maximum temperature between growth stages V10 and V16 exceeded 93 degrees twice, both being 100 degrees, then the daytime heat stress would be the sum of (100−93) for both days equaling a total heat stress of 14 for this period.

In an embodiment, the crop stress index calculation instructions 138 provide instruction to determine a stage one daytime heat stress where, stage one includes phenology stages from V10 to V16 and a defined threshold temperature at 93 degrees. In an embodiment, the crop stress index calculation instructions 138 provide instruction to calculate a stage two and stage three daytime heat stress, where stage two covers R1 through R2, and stage three covers R3 through R5, where the defined threshold temperature is 93 degrees Fahrenheit.

3.5.6 Nighttime Heat Stress

High nighttime temperatures can be extremely detrimental to the growth of corn crop. High nighttime temperatures may cause corn plants to metabolize sugars at a high rate through the night. This may result in the plant over-consuming sugars for the growth period instead of allotting sugar for the production of kernels. High plant metabolism at night can result in diminished yield because the plant does not have enough resources to produce healthy kernels during the reproduction stage. Nighttime heat stress may be calculated as the sum of number of degrees Fahrenheit for each night above a defined threshold. For example, agricultural intelligence computer system 130 may calculate the nighttime heat stress as the sum of the daily minimum temperatures that are above a minimum temperature threshold of 70 degrees Fahrenheit. In an embodiment, the crop stress index calculation instructions 138 provide instruction to calculate a stage one nighttime heat stress, where stage one covers R1 through R5 and the minimum threshold temperature is 70 degrees Fahrenheit.

3.5.7 Nutrient Stress

Lack of one or more nutrients may affect the potential yield of a crop. For example, nitrogen stress describes the effect of a crop's inability to receive an optimal amount of nitrogen on the growth of the crop. Each crop has a different optimal amount of nitrogen which defines a minimum amount of nitrogen below which the growth of the crop is adversely affected. Optimal amounts of nitrogen may change throughout the development cycle of the crop. Nutrient stress may be computed as a difference between a modeled or measured amount of the nutrient in the soil and a value representing the minimum amount of the nutrient that a crop may access below which the growth of the crop is adversely affected. Nutrient stress may also be computed as a number of days in which the crop is unable to meet its need for one or more nutrients. Thus, if nitrate levels in the soil fall below a threshold minimum value for five days, agricultural intelligence computer system 130 may identify a yield response for five days of nitrogen stress.

3.6 Model Strengthening

In an embodiment, agricultural intelligence computer system 130 is programmed to use trial data at one or more locations to strengthen the models of potential yield and total yield. Agricultural intelligence computer system 130 may initially receive trial planting data identifying one or more planting dates, relative maturity values, and yields for a plurality of trial fields. Agricultural intelligence computer system 130 may also receive trial weather data identifying one or more observed weather events at the plurality of trial fields. From the planting dates, relative maturity values, and weather data, agricultural intelligence computer system 130 may compute an estimated yield of crops on the plurality of fields. Agricultural intelligence computer system 130 may compare the estimated yield of the crops with the actual yield of the crops to determine if the model properly captures the effects of planting dates and relative maturity values on the total yield of the crop. Agricultural intelligence computer system 130 may use the results of the comparison to update the models. For example, if modeled yield values associated with a particular relative maturity value tend to be low when compared to actual yield values, agricultural intelligence computer system 130 may update the coefficients associated with the predictor variables of relative maturity to increase the effect of the particular relative maturity value on the yield.

In an embodiment, the trial data comprises trials where one or more factors are kept constant. Agricultural intelligence computer system 130 may be programmed to use the trial data with one or more factors that are kept constant to strengthen the estimation of potential yield with respect to the relative maturity, planting date, and location. For example, one set of trials may include a plurality of locations where a single crop is planted on a particular date. As the planting date and relative maturity do not change, agricultural intelligence computer system 130 may determine an effect of location on the potential yield. A second set of trials may include a plurality of locations with different crops planted on the same planting date. Using this data, agricultural intelligence computer system 130 may identify a location dependent effect of relative maturity on the potential yield and a general effect of relative maturity on the potential yield. Similar trials may be performed with different planting dates at a particular location or at various location using particular seed types. Based on the results of the described trials, agricultural intelligence computer system 130 may update the model of potential yield to better fit the trial data. For example, if the trial data indicates a high variation of yield based on relative maturity data which is underrepresented in the model of potential yield, agricultural intelligence computer system 130 may update the coefficients associated with the predictor variables of relative maturity to increase the effect of relative maturity values on the yield.

4. Model Usage

Referring again to FIG. 7, at step 716, actual production history values are received for crops planted on a particular field. For example, agricultural intelligence computer system 130 may be programmed to receive past crop yield data from field manager computing device 104 relating to one or more fields operated by a user of field manager computing device 104. Additionally, in an embodiment, agricultural intelligence computer system 130 also receives past planting dates and relative maturity values for the particular fields. Using the actual production history values and the past planting dates and relative maturity values, agricultural intelligence computer system 130 may further improve the model of potential yield for a particular location.

At step 718, a particular potential yield for the particular field is computed from the model of potential yield based, at least in part, on the actual production history values for crops planted on the particular field. For example, agricultural intelligence computer system 130 may be programmed to input a particular relative maturity value, a particular planting date, and the actual production history values into the model of potential yield to compute a potential yield for the particular field.

4.1 Estimating Total Crop Yield

In an embodiment, agricultural intelligence computer system 130 is programmed to estimate a total crop yield based on the model of potential yield for a particular location, planting date, relative maturity value, and actual production history. For example, agricultural intelligence computer system 130 may provide an interface to field manager computing device 104 for selecting a field, inputting a planting date and relative maturity value, and requesting an estimated total yield for the crop. The interface may include an option for selecting a planting date and a seed type. Agricultural intelligence computer system 130 may translate the selected date into a relative planting date value. Agricultural intelligence computer system 130 may also translate the seed type into a relative maturity value using the stored seed data. From the input planting date, relative maturity value, actual production history, and field location, agricultural intelligence computer system 130 may compute a potential yield for a particular field.

In some embodiments, agricultural intelligence computer system 130 is programmed to identify an estimated total yield for the particular field before the input planting date. For example, a farmer may request a predicted total yield for the particular field as part of a planning stage. In embodiments where no data is available regarding crop stress, agricultural intelligence computer system 130 may present the potential yield as a maximum value to field manager computing device 104. Additionally and/or alternatively, agricultural intelligence computer system 130 may model the total yield for the crop using estimated values for the crop stress indices.

In an embodiment, agricultural intelligence computer system 130 may be programmed to estimate crop stress index estimates based on past weather and crop management data for the particular location. For example, agricultural intelligence computer system 130 may be programmed to receive past temperature, soil moisture, precipitation, and/or soil nutrient data for the particular field. Temperature and precipitation data may be received from external data server computer 108 and/or one or more sensors located on or near the particular field. Soil moisture and soil nutrient data may be received from field manager computing device 104 and/or one or more sensors located or near the particular field. Additionally and/or alternatively, agricultural intelligence computer system 130 may model the past soil moisture and soil nutrients based on received data indicating precipitation, watering practices, and/or nutrient application practices.

Agricultural intelligence computer system 130 may compute past crop stress indices based on the past weather and crop management data for the particular location. Based on the past crop stress indices, agricultural intelligence computer system 130 may estimate future crop stress indices. For example, agricultural intelligence computer system 130 may take the average value, median value, or most common value of each crop stress index to use as an estimated crop stress index. Additionally and/or alternatively, agricultural intelligence computer system 130 may be programmed or configured to recognize particular trends in crop stress indices and model the particular trends. For example, if crop stress due to high temperatures has been steadily increasing over the past five years, agricultural intelligence computer system 130 may model the increase in crop stress due to high temperatures and use a modeled crop stress index for heat stress in the estimated crop stress indices.

In some embodiments, agricultural intelligence computer system 130 uses estimated future weather and planting practices to estimate crop stress indices for a particular growing period. For example, agricultural intelligence computer system 130 may receive one or more weather forecasts identifying future temperature and precipitation values for an upcoming period of time. Agricultural intelligence computer system 130 may be programmed to estimate crop stress indices based on the forecasted weather data. Additionally and/or alternatively, agricultural intelligence computer system 130 may be programmed to receive planting practices data from field manager computing device 104. For example, agricultural intelligence computer system 130 may provide an interface for inputting planned watering dates and nutrient application dates. Based on the planned watering and nutrient application dates, agricultural intelligence computer system 130 may be programmed to generate estimated crop stress indices based on water and nutrients that are available to the crops on the one or more fields.

Using the estimated crop stress indices and the modeled potential yield for the crop, agricultural intelligence computer system 130 may generate an estimate of the total yield for the crop at the particular location with the particular planting date and relative maturity values. In an embodiment, the estimate of total yield comprises a range of values. For example, agricultural intelligence computer system 130 may identify an uncertainty in the estimated crop stress indices and propagate the uncertainty to the estimated total yield for the crop. Additionally, the range of total yield values may be generated using the random error terms in the model of potential yield and total yield. The random error terms may be assumed to be normally distributed with a mean of zero and a uniformly distributed standard deviation.

In an embodiment, agricultural intelligence computer system 130 may be programmed to update the estimate of total yield during the growing season. For example, using the methods described above, agricultural intelligence computer system 130 may estimate crop stress indices for a growth period of a particular field. During the growth stages of the crop, agricultural intelligence computer system 130 may be programmed to refine the estimates of crop stress indices based on received data. Agricultural intelligence computer system 130 may receive be programmed to temperature, precipitation, soil moisture, and/or nutrient application data for the one or more fields from an external server, one or more sensors on the one or more fields, and/or field manager computing device 104. Based on the received temperature, precipitation, soil moisture, and/or nutrient application data, agricultural intelligence computer system 130 may be programmed to compute crop stress indices for a crop on the one or more fields during the current growing season.

For periods of time in which measurements are available to compute crop stress indices, agricultural intelligence computer system 130 may be programmed to replace the estimated crop stress indices with the computed crop stress indices. For periods of time in which measurements are unavailable, agricultural intelligence computer system 130 may be programmed to update the estimates of crop stress indices based on the recent measurements. For example, if the temperature during the particular growth season is, on average, five degrees Celsius higher than the estimated temperatures, agricultural intelligence computer system 130 may be programmed to estimate the updated crop indices to reflect higher predicted temperatures.

4.2 Planting Date Recommendations

In an embodiment, agricultural intelligence computer system 130 may be programmed to use the model of potential yield and/or the model of total yield to create one or more planting date recommendations for a particular seed type. For example, agricultural intelligence computer system 130 may be programmed to receive a request from field manager computing device 104 for a recommendation of a planting date. Agricultural intelligence computer system 130 may be programmed to provide an interface for selecting a particular type of seed hybrid or for directly inputting a particular relative maturity value. If agricultural intelligence computer system 130 receives a selection of a particular type of seed hybrid, agricultural intelligence computer system 130 may be programmed to translate the particular type of seed hybrid into a relative maturity value. For example, agricultural intelligence computer system 130 may be programmed to store, in model data field data repository 160, data identifying a plurality of seed types and a plurality of corresponding relative maturity values.

Based on the received relative maturity value, agricultural intelligence computer system 130 may be programmed to use the model described above to identify a planting date which maximizes the potential yield and/or total yield for the crop. For example, agricultural intelligence computer system 130 may compute potential yields and/or total yields for the received relative maturity value and each planting date within a particular time period. Agricultural intelligence computer system 130 may identify the planting date associated with the highest computed potential yield and/or total yield. In response to identifying the planting date associated with the highest computed potential yield and/or total yield, agricultural intelligence computer system 130 may send a recommendation of the planting date to field manager computing device.

4.3 Seed Recommendations

In an embodiment, agricultural intelligence computer system 130 is programmed to use the model of potential yield and/or the model of total yield to create one or more seed type recommendations. For example, agricultural intelligence computer system 130 may receive a request for a seed type recommendation from field manager computing device 104. Agricultural intelligence computer system 130 may provide an interface for selecting a particular planting date or range of particular planting dates. Upon receipt of the particular planting date or range of particular planting dates, agricultural intelligence computer system 130 may compute potential yields and/or total yields for each relative maturity value at the particular planting date or for each planting date within the range of particular planting dates. Agricultural intelligence computer system 130 may identify the relative maturity value associated with the highest potential yield and/or total yield and send a recommendation of the relative maturity value to field manager computing device 104. Additionally and/or alternatively, agricultural intelligence computer system 130 may identify one or more hybrid seed types associated with the identified relative maturity value from seed data stored in model data field data repository 160 and send a recommendation of the one or more hybrid seed types to field manager computing device 104.

In an embodiment, agricultural intelligence computer system 130 may be programmed to generate a seed type recommendation in response to determining that a particular date has passed without a crop being planted. For example, agricultural intelligence computer system 130 may initially recommend a planting date based on a particular seed type, a seed type based on one or more particular planting dates, or a combination of planting date and seed type for a particular location. A combination of planting date and seed type may be identified through a computation of potential yield and/or total yield for a particular location for each combination of planting date and seed type. Specific parameters, such as available seeds or temporal limits of the planting season may be imposed to decrease the number of computations. Once the recommended or selected planting date has passed, agricultural intelligence computer system 130 may determine whether a crop has been planted on the one or more fields. For example, agricultural intelligence computer system 130, in response to determining that the particular date has passed and that agricultural intelligence computer system 130 has not received an indication that a crop has been planted on the one or more fields, may send a request to field manager computing device 104 to indicate whether the crop has been planted. In response to receiving an indication that the crop has not been planted, agricultural intelligence computer system 130 may compute potential yields and/or total yields for upcoming possible planting dates using a plurality of relative maturity values.

Agricultural intelligence computer system 130 may be programmed to identify one or more relative maturity values and one or more upcoming planting dates associated with a highest computed potential yield and/or total yield. If agricultural intelligence computer system 130 identifies a relative maturity value that differs from the original relative maturity value, agricultural intelligence computer system 130 may send a recommendation to switch to a seed type that corresponds to the identified relative maturity value. Agricultural intelligence computer system 130 may also send a recommendation to plant the recommended seed type on one or more planting dates in which the identified seed type maximizes the potential yield and/or total yield for the one or more fields.

In an embodiment, agricultural intelligence computer system 130 is programmed to identify recommended relative maturity values for different time periods. For example, agricultural intelligence computer system 130 may identify a first relative maturity value associated with the highest potential yield and/or total yield for planting dates within the next five days and a second relative maturity value associated with the highest potential yield and/or total yield for planting dates within the range of five to ten days from a current time. If the highest overall potential yield and/or total yield is associated with the first relative maturity value, agricultural intelligence computer system 130 may send a recommendation to plant a seed associated with the first relative maturity value on a particular date within the next five days. Additionally, agricultural intelligence computer system 130 may send data indicating that a farmer should instead plant a seed associated with the second relative maturity value if the farmer plans to plant the crop between five to ten days from the current time.

5. Benefits of Certain Embodiments

Using the techniques described herein, a computer can deliver total crop yield data that would be otherwise unavailable. For example, the techniques herein can determine, for a particular field, a particular crop to plant and a particular planting date which maximizes the yield of the crop. The performance of the agricultural intelligence computing system is improved using the techniques described herein which create accurate models with high computational efficiency, thereby reducing the amount of memory used to model total crop yield. Additionally, the techniques described herein may be used to create application parameters for an application controller, thereby improving the performance of farming implements controlled by the application controller.

6. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method for improving performance of a computing system used to model potential crop yield, the method comprising:
    storing, at a server computer system a model of potential crop yield, the model of potential crop yield comprising generated digital modeling data used to compute potential yield as a function of location, planting date, and relative maturity, the model of potential crop yield having been generated from actual production history maps, relative maturity maps, and planting date maps;

receiving, over a network at the server computer system, electronic digital data comprising a plurality of values representing actual production history for a particular field; and computing, from the model of potential crop yield, a particular potential yield for the particular field based, at least in part, on the plurality of values representing actual production history for the particular field.

2. The method of claim 1, further comprising:

receiving, over the network at the server computer system, electronic digital data comprising a plurality of values representing past weather observations for a specific geo-location;

computing one or more crop stress index values from the plurality of values representing past weather observations to create one or more geo-specific crop stress indices;

creating, for each specific geographic area, a covariate matrix in computer memory comprising the one or more geo-specific crop stress indices; and computing, for a particular location, a geographic area specific crop yield based, at least in part, on the covariate matrix comprising the one or more geo-specific crop stress indices and the particular potential yield for the particular field.

3. The method of claim 2, further comprising:

receiving, over the network at the server computer system, an indication that one or more crops have been planted on the particular field;

receiving, over the network at the server computer system, electronic digital data comprising a plurality of values representing observed agricultural data points for the particular field at a particular time, wherein the observed agricultural data points include at least one of an observed temperature record, soil moisture record, and precipitation record;

computing updated crop stress index values from the observed agricultural data points to create one or more updated geo-specific crop stress indices, wherein each of the updated geo-specific crop stress indices includes one or more calculated crop stress index values for the particular field over a specified period of time;

creating, for the particular field, an updated covariate matrix in computer memory comprising the one or more updated geo-specific crop stress indices; and computing an updated geographic area specific crop yield based, at least in part, on the updated covariate matrix and the particular potential yield for the particular field.

4. The method of claim 1, further comprising:

storing, in digital memory of the server computer system, crop relative maturity data comprising a plurality of seed types and a plurality of associated relative maturity values;

receiving, over the network at the server computer system, a proposed planting date for the particular field;

determining, from the model of potential crop yield, the proposed planting date for the particular field, and the plurality of values representing actual production history for the particular field, a particular relative maturity value that maximizes a potential yield for the particular field;

identifying, in the crop relative maturity data, a particular seed type corresponding to the particular relative maturity value; and sending, over the network to a field manager computing device, a recommendation of the particular seed type for the proposed planting date for the particular field.

5. The method of claim 1, further comprising:

receiving, over the network at the server computer system, a proposed relative maturity value for the particular field;

determining, from the model of potential crop yield, the proposed relative maturity value for the particular field, and the plurality of values representing actual production history for the particular field, a particular planting date that maximizes a potential yield for the particular field; and sending, over the network to a field manager computing device, a recommendation of the particular planting date for the proposed relative maturity for the particular field.

6. The method of claim 5, further comprising:

storing, in digital memory of the server computer system, crop relative maturity data comprising a plurality of seed types and a plurality of associated relative maturity values;

determining that the particular planting date has passed;

receiving, over the network at the server computer system, an indication that a crop has not been planted on the particular field;

determining, from the model of potential crop yield, the plurality of values representing actual production history for the particular field, and one or more of a current date or a proposed future planting date, a particular relative maturity value that is different than the proposed relative maturity value and maximizes a potential yield for the particular field;

identifying, in the crop relative maturity data, a particular seed type corresponding to the particular relative maturity value; and sending, over the network to a field manager computing device, a recommendation of the particular seed type for the proposed future planting date for the particular field.

7. The method of claim 1, further comprising:

receiving, over the network at the server computer system, electronic digital data comprising a plurality of values representing trial planting dates and trial relative maturities at a plurality of fields;

receiving, over the network at the server computer system, electronic digital data comprising a plurality of values representing observed agricultural events at the plurality of fields;

computing a modeled crop yield for each field of the plurality of fields based, at least in part, on the trial planting dates, trial relative maturities, observed agricultural events, and the model of potential crop yield;

receiving, over the network at the server computer system, electronic digital data comprising a plurality of values representing an observed crop yield for each field of the plurality of fields; and computing an updated model of potential crop yield based, at least in part, on the modeled crop yield for each field of the plurality of fields and the observed crop yield for each field of the plurality of fields.

8. The method of claim 1, further comprising, generating the model of potential crop yield as a linear function comprising a constant term multiplied by a set of covariates.

9. The method of claim 8 wherein the set of covariates include a planting date term, a square of the planting date term, a relative maturity term, a square of the relative maturity term, and an actual production history term.

10. The method of claim 1, further comprising:
    determining, based, at least in part, on one or more relative maturity maps, one or more planting date maps, and one or more actual production history maps, a dependence of potential yield on location; and
    generating the model of potential crop yield as a linear function comprising a constant term multiplied by a location dependent set of covariates.

11. One or more non-transitory computer readable media storing instructions which, when executed by one or more processors, cause performance of a method comprising the steps of:
    storing, at a server computer system a model of potential crop yield, a model of potential crop yield comprising generated digital modeling data used to compute potential yield as a function of location, planting date, and relative maturity, the model of potential crop yield having been generated from actual production history maps, relative maturity maps, and planting date maps;
    receiving, over a network at the server computer system, electronic digital data comprising a plurality of values representing actual production history for a particular field; and
    computing, from the model of potential crop yield, a particular potential yield for the particular field based, at least in part, on the plurality of values representing actual production history for the particular field.

12. The one or more non-transitory computer readable media of claim 11, wherein the instructions, when executed by the one or more processors, further cause performance of:
    receiving, over the network at the server computer system, electronic digital data comprising a plurality of values representing past weather observations for a specific geo-location;
    computing one or more crop stress index values from the plurality of values representing past weather observations to create one or more geo-specific crop stress indices;
    creating, for each specific geographic area, a covariate matrix in computer memory comprising the one or more geo-specific crop stress indices; and
    computing, for a particular location, a geographic area specific crop yield based, at least in part, on the covariate matrix comprising the one or more geo-specific crop stress indices and the particular potential yield for the particular field.

13. The one or more non-transitory computer readable media of claim 12, wherein the instructions, when executed by the one or more processors, further cause performance of:
    receiving, over the network at the server computer system, an indication that one or more crops have been planted on the particular field;
    receiving, over the network at the server computer system, electronic digital data comprising a plurality of values representing observed agricultural data points for the particular field at a particular time, wherein the observed agricultural data points include at least one of an observed temperature record, soil moisture record, and precipitation record;
    computing updated crop stress index values from the observed agricultural data points to create one or more updated geo-specific crop stress indices, wherein each of the updated geo-specific crop stress indices includes one or more calculated crop stress index values for the particular field over a specified period of time;
    creating, for the particular field, an updated covariate matrix in computer memory comprising the one or more updated geo-specific crop stress indices; and
    computing an updated geographic area specific crop yield based, at least in part, on the updated covariate matrix and the particular potential yield for the particular field.

14. The one or more non-transitory computer readable media of claim 11, wherein the instructions, when executed by the one or more processors, further cause performance of:
    storing, in digital memory of the server computer system, crop relative maturity data comprising a plurality of seed types and a plurality of associated relative maturity values;
    receiving, over the network at the server computer system, a proposed planting date for the particular field;
    determining, from the model of potential crop yield, the proposed planting date for the particular field, and the plurality of values representing actual production history for the particular field, a particular relative maturity value that maximizes a potential yield for the particular field;
    identifying, in the crop relative maturity data, a particular seed type corresponding to the particular relative maturity value; and
    sending, over the network to a field manager computing device, a recommendation of the particular seed type for the proposed planting date for the particular field.

15. The one or more non-transitory computer readable media of claim 11, wherein the instructions, when executed by the one or more processors, further cause performance of:
    receiving, over the network at the server computer system, a proposed relative maturity value for the particular field;
    determining, from the model of potential crop yield, the proposed relative maturity value for the particular field, and the plurality of values representing actual production history for the particular field, a particular planting date that maximizes a potential yield for the particular field; and
    sending, over the network to a field manager computing device, a recommendation of the particular planting date for the proposed relative maturity for the particular field.

16. The one or more non-transitory computer readable media of claim 15, wherein the instructions, when executed by the one or more processors, further cause performance of:
    storing, in digital memory of the server computer system, crop relative maturity data comprising a plurality of seed types and a plurality of associated relative maturity values;
    determining that the particular planting date has passed;
    receiving, over the network at the server computer system, an indication that a crop has not been planted on the particular field;
    determining, from the model of potential crop yield, the plurality of values representing actual production history for the particular field, and one or more of a current date or a proposed future planting date, a particular relative maturity value that is different than the proposed relative maturity value and maximizes a potential yield for the particular field;
    identifying, in the crop relative maturity data, a particular seed type corresponding to the particular relative maturity value; and sending, over the network to a field manager computing device, a recommendation of the particular seed type for the proposed future planting date for the particular field.

17. The one or more non-transitory computer readable media of claim 11, wherein the instructions, when executed by the one or more processors, further cause performance of:
receiving, over the network at the server computer system, electronic digital data comprising a plurality of values representing trial planting dates and trial relative maturities at a plurality of fields;
receiving, over the network at the server computer system, electronic digital data comprising a plurality of values representing observed agricultural events at the plurality of fields;
computing a modeled crop yield for each field of the plurality of fields based, at least in part, on the trial planting dates, trial relative maturities, observed agricultural events, and the model of potential crop yield;
receiving, over the network at the server computer system, electronic digital data comprising a plurality of values representing an observed crop yield for each field of the plurality of fields; and
computing an updated model of potential crop yield based, at least in part, on the modeled crop yield for each field of the plurality of fields and the observed crop yield for each field of the plurality of fields.

18. The one or more non-transitory computer readable media of claim 11, wherein the instructions, when executed by the one or more processors, further cause performance of:
generating the model of potential crop yield as a linear function comprising a constant term multiplied by a set of covariates.

19. The one or more non-transitory computer readable media of claim 18, wherein the set of covariates include a planting date term, a square of the planting date term, a relative maturity term, a square of the relative maturity term, and an actual production history term.

20. The one or more non-transitory computer readable media of claim 11, wherein the instructions, when executed by the one or more processors, further cause performance of:
determining, based, at least in part, on one or more relative maturity maps, one or more planting date maps, and one or more actual production history maps, a dependence of potential yield on location; and
generating the model of potential crop yield as a linear function comprising a constant term multiplied by a location dependent set of covariates.

* * * * *